US011523703B2

(12) United States Patent
Ford

(10) Patent No.: US 11,523,703 B2
(45) Date of Patent: Dec. 13, 2022

(54) BREWER SYSTEM, METHOD AND APPARATUS

(71) Applicant: BUNN-O-MATIC CORPORATION, Springfield, IL (US)

(72) Inventor: David F. Ford, Springfield, IL (US)

(73) Assignee: Bunn-O-Matic Corporation, Springfield, IL (US)

(*) Notice: Subject to any disclaimer, the term of this patent is extended or adjusted under 35 U.S.C. 154(b) by 586 days.

(21) Appl. No.: 16/255,265

(22) Filed: Jan. 23, 2019

(65) Prior Publication Data

US 2019/0223652 A1 Jul. 25, 2019

Related U.S. Application Data

(60) Provisional application No. 62/620,540, filed on Jan. 23, 2018.

(51) Int. Cl.
A47J 31/36 (2006.01)
A47J 31/40 (2006.01)
A23F 5/26 (2006.01)
A47J 31/46 (2006.01)
A47J 31/32 (2006.01)
A47J 31/06 (2006.01)
A47J 31/00 (2006.01)

(52) U.S. Cl.
CPC ............ A47J 31/408 (2013.01); A23F 5/262 (2013.01); A47J 31/0663 (2013.01); A47J 31/32 (2013.01); A47J 31/3609 (2013.01); A47J 31/3652 (2013.01); A47J 31/467 (2013.01); A47J 31/002 (2013.01)

(58) Field of Classification Search
CPC ...... A47J 31/002; A47J 31/0663; A47J 31/32; A47J 31/3609; A47J 31/3652; A47J 31/3657; A47J 31/3661; A23F 5/262
USPC ............. 99/289 R, 289 T, 302 R, 302 P, 303
See application file for complete search history.

(56) References Cited

U.S. PATENT DOCUMENTS

| 3,356,011 | A | 12/1967 | Parraga |
| 4,506,596 | A | 3/1985 | Shigenobu et al. |
| 4,757,752 | A | 7/1988 | Robins et al. |
| 4,829,889 | A | * 5/1989 | Takeuchi ............ A47J 31/3633 99/289 P |
| 4,967,647 | A | 11/1990 | King |
| 5,197,373 | A | 3/1993 | De Jong |
| 5,297,472 | A | 3/1994 | Suzuki et al. |
| 5,393,540 | A | 2/1995 | Bunn et al. |
| 5,878,653 | A | 3/1999 | Verhoef |
| 6,041,693 | A | 3/2000 | Fukushima |
| 6,085,637 | A | 7/2000 | Fukushima |
| 6,279,461 | B1 | 8/2001 | Fukushima et al. |
| 7,448,314 | B2 | 11/2008 | Ioannone et al. |

(Continued)

FOREIGN PATENT DOCUMENTS

CA 2940061 A1 * 8/2015 .......... A47J 31/3657
WO WO 1988/002612 4/1988

Primary Examiner — Reginald Alexander
(74) Attorney, Agent, or Firm — Barnes & Thornburg LLP

(57) ABSTRACT

A brewer system includes a reservoir, a steep chamber movable relative to the reservoir and positioned over a mouth of the reservoir, and a filter tape positioned between the chamber and the reservoir. Brewing substance and water are added to the chamber to form a brewed beverage that passes through the filter tape and into the reservoir through the mouth.

3 Claims, 4 Drawing Sheets

(56) References Cited

U.S. PATENT DOCUMENTS

| | | |
|---|---|---|
| 7,581,489 B2 | 9/2009 | Van Hattem et al. |
| 7,726,233 B2 | 6/2010 | Kodden et al. |
| 7,858,135 B2 | 12/2010 | Radosav |
| 8,286,547 B1 | 10/2012 | Lassota |
| 8,850,958 B2 | 10/2014 | McCormick et al. |
| 8,950,318 B2 | 2/2015 | Ford |
| 2011/0039009 A1 | 2/2011 | Jones et al. |
| 2012/0100275 A1 | 4/2012 | Bishop et al. |
| 2013/0156899 A1 | 6/2013 | Quinn et al. |
| 2013/0344205 A1 | 12/2013 | Oh |
| 2014/0170280 A1 | 6/2014 | St. Germain et al. |
| 2017/0055759 A1 | 3/2017 | Radosav |

* cited by examiner

BREWER SYSTEM, METHOD AND APPARATUS

PRIORITY CLAIM

This application claims priority under 35 U.S.C. § 119(e) to U.S. Provisional Application Ser. No. 62/620,540, filed Jan. 23, 2018, the disclosure of which is expressly incorporated by reference herein.

BACKGROUND

A variety of brewing systems have been developed which provide for individual cups of coffee to be brewed on demand Loose coffee grounds can spread over the components of the brewing system affecting the function thereof. For the foregoing reasons, it is desirable to try to improve the available systems.

This background information is merely for context and no admission is intended, nor should such admission be inferred or construed, that any of the preceding information constitutes prior art against the present disclosure.

SUMMARY

According to the present disclosure, a brewer system includes a reservoir, a steep chamber movable relative to the reservoir and positioned over a mouth of the reservoir, and a filter tape positioned between the chamber and the reservoir. Brewing substance and water are added to the chamber to form a brewed beverage that passes through the filter tape and into the reservoir through the mouth.

In illustrative embodiments, the reservoir includes a body and a lid coupled to the body. The lid includes a base and a raised platform coupled to the base. A filter element is supported by the raised platform over the mouth to support the filter tape. The raised platform includes a perimeter wall extending upward from the base and a sealing surface defined at an upper end of the perimeter wall around the filter element. The mouth is formed through the lid and aligned with the raised platform.

In illustrative embodiments, the filter tape wipes loose brewing substance off of the sealing surface of the raised platform as the filter tape moves relative to the reservoir. The loose brewing substance falls onto the base and is spaced apart from the sealing surface of the raised platform. The steep chamber is lowered onto the raised platform over the filter tape to form a seal with the sealing surface around the mouth.

BRIEF DESCRIPTION OF THE DRAWINGS

The present disclosure will be described hereafter with reference to the attached drawings which are given as a non-limiting example only, in which.

Figure 1:
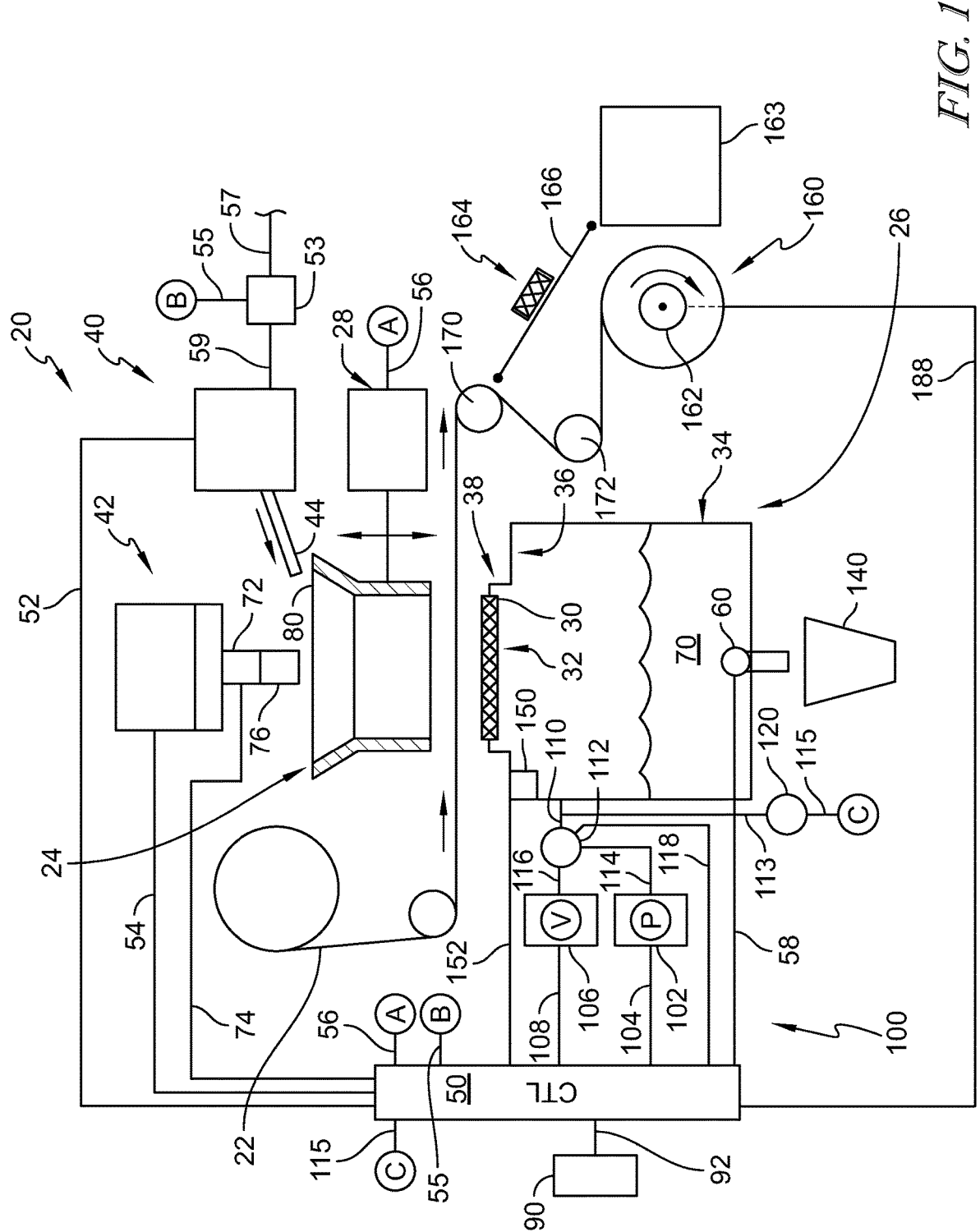
FIG. 1 is a diagrammatic illustration of a brewer system in accordance with the present disclosure showing that the brewer system includes a brew reservoir, a steep chamber positioned above the brew reservoir for movement relative thereto, and a filter tape positioned between the steep chamber and the brew reservoir and suggesting that the steep chamber is aligned with a raised platform of the brew reservoir.

The exemplification set out herein illustrates embodiments of the disclosure that are not to be construed as limiting the scope of the disclosure in any manner Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. In addition, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof herein are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive.

Terms including beverage, brewed, brewing, brewing substance, brewed liquid, and brewed beverage as may be used herein are intended to be broadly defined as including, but not limited to, the brewing of coffee, tea and any other beverages. This broad interpretation is also intended to include, but is not limited to any process of dispensing, infusing, steeping, reconstituting, diluting, dissolving, saturating or passing a liquid through or otherwise mixing or combining a brewing substance with a liquid such as water without limitation to the temperature of such liquid unless specified. This broad interpretation is also intended to include, but is not limited to, brewing substances such as ground coffee, tea, liquid beverage concentrate, powdered beverage concentrate, flaked, granular, freeze dried or other forms of materials including liquid, gel, crystal or other forms of beverage or food materials to obtain a desired beverage or other food product. Beverage brewing substances will be described in the present application and generally will be referred to as "coffee". However, it should be understood that the term brewing substance should be broadly interpreted regardless of reference to brewing substance or coffee.

The foregoing terms as well as other terms should be broadly interpreted throughout this application to include all known as well as all hereafter discovered versions, equivalents, variations and other forms of the abovementioned terms as well as other terms. The present disclosure is intended to be broadly interpreted and not limited.

As shown in FIG. 1, a brewer system 20 is illustrated in a generally diagrammatic form. The brewer system 20 traps a filter tape 22, such as a porous fabric or paper tape, between a steep chamber 24 and a collection reservoir 26 to brew a beverage, such as liquid coffee, using a whole or ground brewing substance, such as coffee beans. A chamber-displacement mechanism 28 is designed and configured to controllably move the chamber 24 relative to the tape 22 and the reservoir 26. In the illustrative embodiment, the chamber-displacement mechanism 28 lifts the chamber 24 upwardly and downwardly (in the orientation of FIG. 1) relative to the tape 22 and reservoir 26 to selectively trap the tape 22 between the chamber 24 and the reservoir 26.

The reservoir 26 includes a body 34 and a lid 36 coupled to the body 34 as shown in FIG. 1. The lid 36 is formed to include a mouth 32 extending through the lid 36 and aligned with a raised platform 38 of the lid 36. A generally permanent retaining filter element 30 is retained in the area of the mouth 32. This permanent filter element 30 helps to provide structural support underneath the filter tape 22 when it is positioned between the chamber 24 and over the mouth 32 of the reservoir 26 for brewing. The raised platform 38 provides an offset from the remainder of the lid 36 to reduce accumulation of brewing substance and other debris on top of the raised platform 38 so that the steep chamber 24 and the filter tape 22 can seal against the raised platform 38 around mouth 32 during the brewing process.

Figure 2:
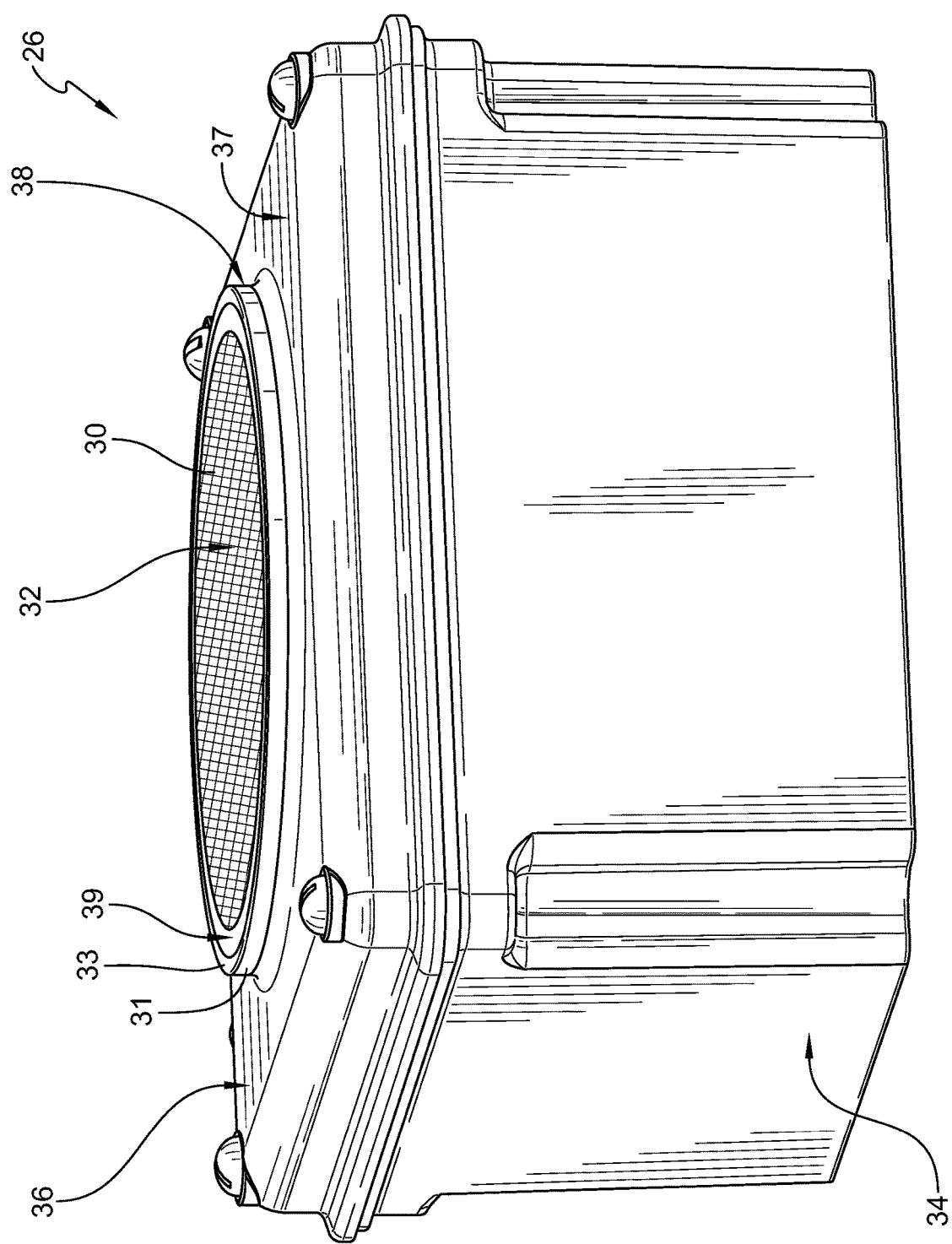
FIG. 2 is a perspective view of the brew reservoir of FIG. 1 showing that a lid of the brew reservoir includes a base and the raised platform and suggesting that a sealing surface of the raised platform is spaced apart from the base by a perimeter wall.

The lid 36 of reservoir 26 includes a base 37 and the raised platform 38 coupled to the base 37 as shown in FIG. 2. The raised platform 38 includes a perimeter wall 31 extending upward (in the orientation of FIG. 2) from the base 37 and a gasket 39 coupled to an upper end 33 of the perimeter wall 31 away from the base 37. The gasket defines a sealing surface of the perimeter wall 31. The sealing surface of the gasket 39 is spaced apart from the base 37. The gasket 39 is positioned around the mouth 32 and the filter element 30. The mouth 32 is formed through the lid 36 and extends into an interior region of the reservoir 26 defined by the body 34 and the lid 36.

Figure 3:
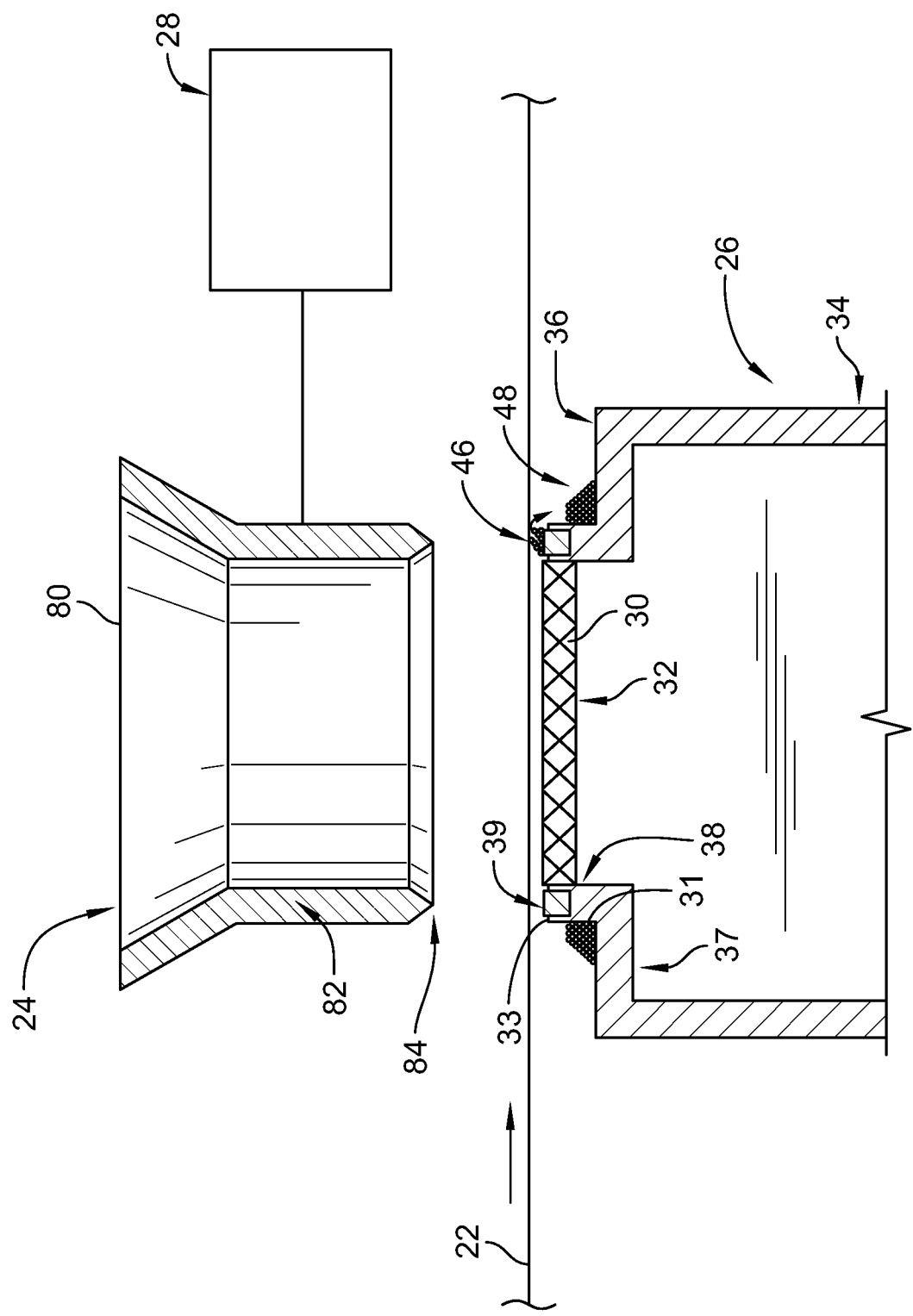
FIG. 3 is an enlarged view of the brewer system of FIG. 1 showing loose brewing substance positioned on the raised platform and suggesting that movement of the filter tape relative to the brew reservoir wipes the loose brewing substance off of the raised platform.
Figure 4:
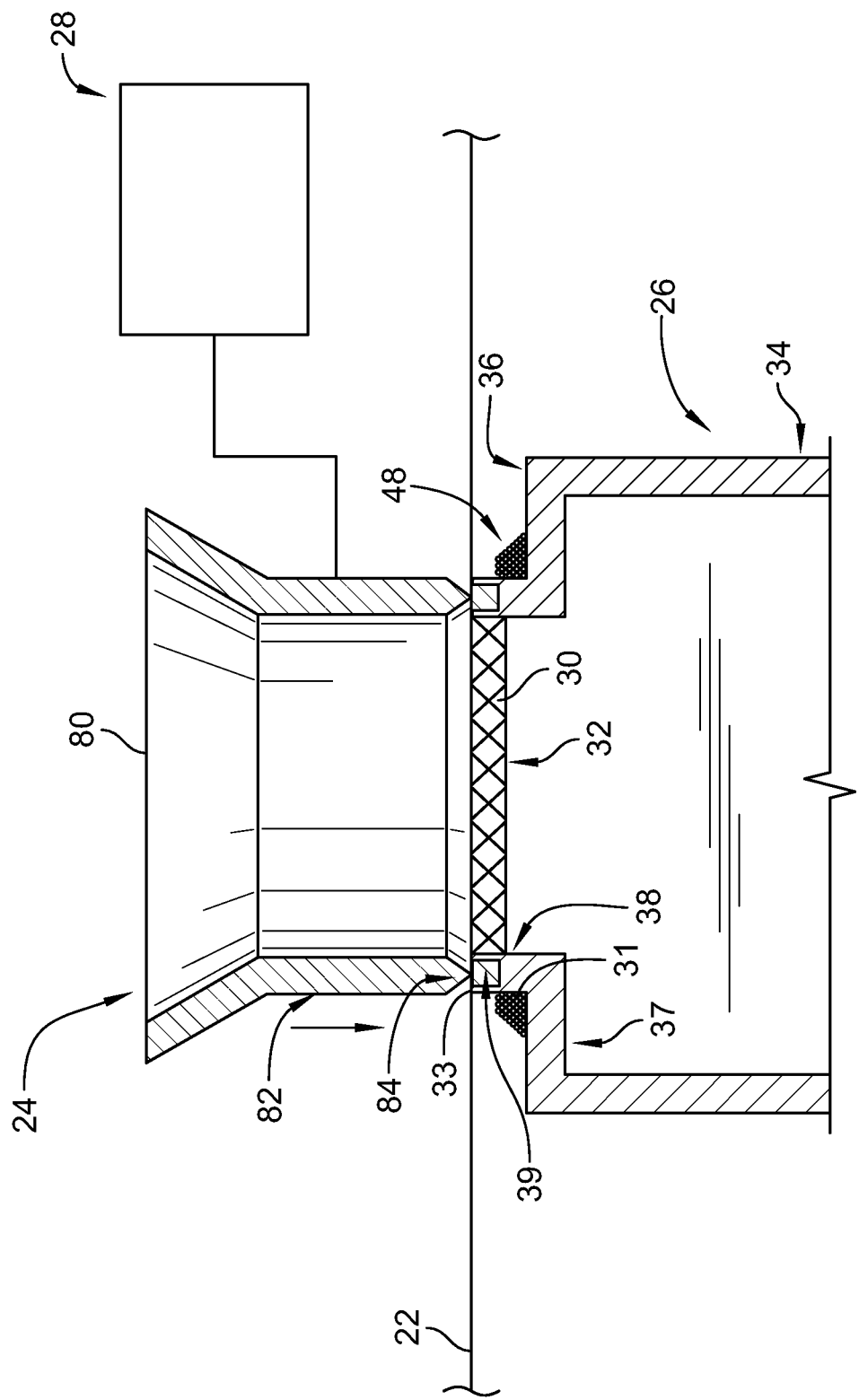
FIG. 4 is a view similar to FIG. 3 showing the steep chamber lowered onto the raised platform over the filter tape to form a seal around a mouth of the reservoir.

The steep chamber 24 is lowered onto the raised platform 38 over the filter tape 22 by the chamber-displacement mechanism 28 during a brew process as suggested in FIGS. 3 and 4. A side wall 82 of the steep chamber 24 defines an open top portion 80 at an upper end and a beveled edge 84 at a lower end. The beveled edge 84 forces the filter tape 22 against the sealing surface of the gasket 39 to form a seal around the mouth 32 when the steep chamber 24 is lowered as shown in FIG. 4.

Loose brewing substance 46, or other debris, can become positioned on the sealing surface of the gasket 39 and inhibit the ability of the steep chamber 24 and the filter tape 22 to form a seal around the mouth 32 as suggested in FIG. 3. The sealing surface of the gasket 39 is offset from the base 37 of the lid 36 so that an accumulation of loose brewing substance 48 forms outward of the sealing area around the mouth 32. In some embodiments, movement of the filter tape 22 between brew cycles wipes the loose brewing substance 46 off of the sealing surface of the gasket 39. In some embodiments, other mechanical or pneumatic actions can be used to force the loose brewing substance 46 off of the sealing surface of the gasket 39. For example, an air sprayer, wiping blade, or movement of the steep chamber 24 onto the raised platform 38 can force the loose brewing substance 46 off of the sealing surface of the gasket 39.

A controllable water delivery system 40 and a controllable brewing substance delivery system 42 are coupled to a controller 50 over lines 52 and 54, respectively, as shown in FIG. 1. The chamber-displacement mechanism 28 is coupled to the controller 50 over line 56. During a brewing cycle, the chamber 24 is positioned by the chamber-displacement mechanism 28 over the filter tape 22 onto the raised platform 38 to form a seal around the mouth 32. Brewing substance, such as ground coffee, is dispensed from the brewing substance delivery system 42 into the chamber 24. Brewing substance can be retained in the delivery system 42 and be controllably dispensed using the controller 50. In some embodiments, brewing substance, such as fresh whole coffee beans, can be retained in the delivery system 42 and controllably ground on demand using a grinding mechanism 72 coupled to the controller 50 over line 74. A dispense chute or nozzle 76 directs the ground material into the open top portion 80 of the chamber 24. Water is dispensed from the water delivery system 40 through a dispense port 44 into the chamber 24 for mixing with the brewing substance to form a slurry which is retained in the steep chamber 24. The water can be at any temperature depending on the recipe and the substances used for the beverage being made, but is heated for brewing coffee in the present example. In some embodiments, water delivery system 40 is in the form of a holding tank that is controllably filled from an inlet line 57 using a controllable valve 53. Valve 53 is coupled to controller 50 by line 55 and to water delivery system 40 by line 59.

Water is introduced from the water delivery system 40 by the controller 50 to controllably dispense a predetermined volume of water to be mixed with a predetermined volume of brewing substance as suggested in FIG. 1. The dispense port 44 can be positioned to direct water into the chamber 24 such that swirling and mixing of the water with the brewing substance in the chamber 24 is induced to form a slurry. In this configuration, the brewing substance can be allowed to steep for a period of time to extract desirable characteristics from the brewing substance. A predetermined steeping or "dwell" time can be programmed at the controller 50 either in the factory or by a user at a control interface 90 coupled to the controller over line 92.

At a predetermined time during the brew cycle, either at the beginning or after a predetermined steep time, a pressure control system 100 is operated to provide positive pressure to the reservoir 26 to drive a gas, such as ambient atmosphere or "air," upwardly through the permanent filter element 30 and through the tape 22 to cause agitation of the slurry as suggested in FIG. 1. The pressure control system 100 can also be controllably operated to provide negative pressure, or vacuum, to draw brewed beverage 70, such as liquid coffee, from the slurry in the chamber 24 through the filter tape 22 and through the permanent filter element 30. The pressure control system 100 includes a controllable gas pump 102 coupled to the controller 50 over line 104 and a vacuum pump 106 coupled to the controller 50 over line 108. The gas pump 102 and vacuum pump 106 communicate with a reservoir line 110. Positioned in the reservoir line 110 is a multi-way valve 112. The multi-way valve 112 allows the gas pump 102 to communicate with the valve 112 over line 114 and the vacuum pump 106 to communicate with the valve 112 over line 116. The multi-way valve 112 is connected to the controller 50 over line 118.

During the brewing cycle one or more positive pressure agitation cycles can be used to agitate the slurry in the chamber 24 as suggested in FIG. 1. At the end of the cycle, the vacuum pump 106 is operated to pull brewed beverage 70 from the slurry through the filter tape 22 and permanent filter element 30 into the reservoir 26. If a sufficient volume of brewed beverage 70 has been brewed it can be dispensed directly through a dispense valve 60 into a cup 140. However, if multiple dispenses are required, the system 20 can cycle to remove the spent brewing substance 164 and operate a new brew cycle to provide an additional volume of brewed beverage 70 for dispensing to the consumer. In this type of brew cycling, multiple batches of brewed beverage 70 are produced and retained in the reservoir 26 to create a delay or buffer so that the combined volume of brewed beverage 70 is dispensed as a single dispense. This controlled dispensing eliminates the problems associated with multiple dispense confusion by the user. In other words, when the required total volume of brewed beverage 70 has been produced, using more than one brewing cycle, and collected and retained in the reservoir 26, the total combined volume can be dispensed as a single serving dispense step at the end of the multiple brewing cycles. The dispense valve 60 of the reservoir 26 is coupled to the controller 50 over line 58. The dispense valve 60 can also be in a mechanical form, although it is preferable to provide a controllable dispense valve for multiple brew dispensing.

The system 20 optimizes the time of the brew cycle by including a vacuum sensor 120 as suggested in FIG. 1. The vacuum sensor 120 is coupled to and communicates with the line 110 over a line 113 to detect the vacuum in the line 110. While most of the other steps in the brew cycle can be defined by discreet time periods, the ability to draw all of the brewed beverage 70 out of the chamber 24 may not be optimized if only operated by a time cycle. In other words, depending on the temperature of the water, the type of brewing substance (coffee, tea, etc., and in the case of coffee, regular or decaf), the size of the brewing substance particles, and other conditions and variables, the time required to sufficiently drain the spent brewing substance 164 at the end of a brew cycle may be longer or shorter than a predetermined discreet preprogrammed period of time. If the time is too short, the spent brewing substance 164 will not be sufficiently drained and a liquid portion of slurry can flow off the filter tape 22 and create a mess in the brewer system 20. If the "drying" portion of the brew cycle runs too long, the spent brewing substance 164 will be dry but the time between brewing cycles will have been increased which wastes time and lowers efficiency. It is important to minimize the time for this step between brewing cycles especially if multiple batches are being brewed for a single user. This is also important when multiple users are addressing the brewer so that the amount of time between complete brew sessions can also be reduced. The "drying" portion of the brew cycle also dries the filter tape 22 to allow the filter tape to release from the filter element 30 and minimize sticking. Dry filter tape 22 and filter element 30 also maximizes venting of the reservoir 26 to allow adequate flow of the brewed beverage during dispensing.

In the illustrative embodiment, the vacuum sensor 120, coupled to the controller 50 by line 115, detects the drop of the vacuum to a predetermined or below a predetermined level of vacuum to provide a signal to the controller 50 to cease operation of the vacuum pump 106 as suggested in FIG. 1. The predetermined level of vacuum is set to correspond to that vacuum that indicates a sufficient amount of liquid has been drained from the beverage brewing substance/slurry. In some embodiments, the controller 50 ceases operation of the vacuum pump 106 after the vacuum sensor 120 detects a predetermined change in vacuum pressure from a pre-set maximum vacuum pressure that can be different for different brewed beverages and brewing substances. The chamber 24 is open to the ambient atmosphere and as such this level of vacuum could be the point at which ambient atmosphere starts to be drawing through the remaining beverage brewing substance after most of the liquid component of the prior slurry has been removed. This will not result in dried substance, rather it is anticipated that the remaining substance will be moist. However, this sensing of the vacuum will help reduce unnecessary dwell time operating the vacuum pump 106 and prevent under drained substance, as well.

The controller can be programmed with a maximum vacuum time that generally will be caused by an error in the system. As an example of one error, that could cause the vacuum pump to operate for a longer time, the filter could somehow become clogged or otherwise blocked. This could result in the liquid beverage not being drained from the slurry in the chamber. The maximum vacuum run time will be detected by the controller and alert the user to the error. The controller can then lockout further operation of the brewer until the error is diagnosed and cleared.

The sensor 120 can be in the form of a transducer coupled to the line 110 to directly detect the vacuum and provide a signal to the controller 50. The vacuum sensor 120 ensures a sufficient amount of brewed beverage 70 has been drained from the spent brewing substance 164 to prevent slurry spill or seepage off the tape 22. This also optimizes brew time by indicating when the formation of brewed beverage 70 is complete. In some embodiments, a power level of the vacuum pump 106 is sensed to detect a drop in power required to operate the pump indicating that the vacuum pull is sufficiently complete and the pump is drawing a vacuum through sufficiently drained brewing substance.

The reservoir 26 in the present embodiment is sized to accommodate multiple batch volumes of brewed beverage as suggested in FIG. 1. The system 20 can offer multiple size choices for the dispensed volume of brewed beverage 70, and the volume that the reservoir 26 can receive and retain for each complete brew session is sized accordingly so that a single dispense of brewed beverage 70 is made at the end of the required number of brewing sessions. The size of the reservoir 26 can be determined based on the largest maximum volume to be produced plus, perhaps, some additional tolerance space or volume. A level sensor 150 coupled to the controller 50 over line 152 can be used to sense an overflow condition. While the system 20 can be configured to prevent overflow by other controls associated with the components provided, a level sensor 150 can be included in the system 20.

Used tape 22 is collected by a filter tape take-up system 160 as suggested in FIG. 1. A primary take-up spool 162 is provided and is driven by a motor attached to controller 50 over a line 188. A leading end of the tape 22 is attached to spool 162 to drive the take-up of the spent filter tape 22. As shown, the spent filter tape take-up system 160 also helps to transport a spent cake of drained brewing substance 164 from the tape 22 to a transfer slide 166 so it can be deposited into a waste bin 163 for accumulation and later disposal. A first spool 170 and a second spool 172 are provided to direct the filter tape along its path. The first spool 170 is used to direct the filter tape 22 towards the slide 166 and facilitate transfer of the drained brewing substance cake 164 to the slide 166. In some embodiments, at least one of the guiding spools can detect the movement of the tape 22.

In one illustrative embodiment, a brew cycle begins with grinding whole bean brewing substance for dispensing, or dispensing preground brewing substance, into the steep chamber 24. Water is added to the chamber 24 to mix with the brewing substance. The combined slurry can selectively be allowed to steep in the chamber 24, depending on the programming of the controller 50, and then can be agitated with pressure from the gas introduced to the reservoir 26 by controllably operating the gas pump 102 as discussed above. After a predetermined steep time, or no steep time depending on the programming of the controller 50 and the corresponding recipe, at least a partial vacuum is created in the reservoir 26 by the vacuum pump 106 to pull brewed beverage 70 from the chamber 24 into the reservoir 26. The vacuum pull continues until vacuum pressure within the reservoir 26 drops off to or below a predetermined pressure and the vacuum pump 106 is turned off. In some embodiments, a maximum vacuum pull time is used to turn off the vacuum pump 106 if the vacuum pressure does not drop off, such as when a filter or port becomes clogged for example. In some embodiments, a user is notified if the vacuum pull time exceeds a maximum time limit.

Additional brew cycles can be conducted depending on the volume of brewed beverage requested. The volume of brewed beverage is stored in the reservoir 26 as an additional brew cycle or cycles are conducted. Once a desired predetermined amount of brewed beverage is formed, the brewed beverage is dispensed from the reservoir 26. The chamber 24 is lifted off the reservoir 26 and the filter tape 22 is advanced to provide a fresh section of tape 22 and to dispose of the drained spent brewing substance 164. An additional operation can be conducted to remove any loose brewing substance 46 from the gasket 39. The chamber 24 is replaced onto the reservoir 26 and the system 20 is reset for another cycle.

The foregoing disclosure provides many improvements over the prior art.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation to encompass all such modifications and equivalent structures and functions.

What is claimed is:

1. A brewer system comprising:
    a reservoir including a body defining an interior region and a lid coupled to the body, the lid formed with a mouth extending therethrough and communicating with the interior region of the reservoir;
    a filter tape extending over the mouth of the reservoir and controllably movable relative to the reservoir;
    a steep chamber controllably movable relative to the reservoir, the steep chamber configured to retain a portion of the filter tape over the mouth of the lid during a brewing cycle;
    a brewing substance delivery system configured to dispense brewing substance into the steep chamber during a brewing cycle;
    a water delivery system configured to controllably dispense water into the steep chamber to mix with the brewing substance and form a brewed beverage during a brewing cycle;
    the lid includes a base and a raised platform having a perimeter wall extending upwardly from the base, the mouth defined within the raised platform with a gasket providing a sealing surface carried on an upper end of the perimeter wall spaced away from the base; and
    the steep chamber is aligned with the raised platform and is controllably displaceable toward the raised platform for brewing beverage and away from the raised platform when not brewing beverage, a lower end of the steep chamber facing the raised platform formed with a beveled edge, the beveled edge forcing the filter tape against the gasket when the steep chamber is displaced toward the platform during a brewing cycle to form a seal around the mouth.

2. A method of operating a brewer system, the method comprising:
    providing a reservoir having a body defining an interior region and a lid coupled to the body;
    providing the lid with a mouth extending therethrough and communicating with the interior region of the reservoir;
    providing a base of the lid with a raised platform positioned upwardly from the base, a perimeter wall extending between the base and the raised platform to space the raised platform above the base;
    providing a gasket coupled to and upper end of the perimeter wall spaced from the base, the mouth aligned with the raised platform, and the gasket defining a sealing surface on the upper end surrounding the mouth;
    positioning a steep chamber aligned with the raised platform and controllably displaceable toward and away from the raised platform;
    providing a beveled edge on a lower end of the steep chamber;
    providing a filter tape system for controllably moving a filter tape between the raised platform of the lid and the steep chamber;
    providing a filter element on the raised platform extending over the mouth and configured to support a portion of the filter tape;
    advancing a portion of the filter tape over the filter element;
    controllably displacing the steep chamber against the gasket;
    trapping the portion of the filter tape between the steep chamber and the reservoir with the beveled edge of the steep chamber forcing the filter tape against the gasket forming a seal around the mouth;
    controllably dispensing a brewing substance and water into the steep chamber and onto the portion of filter tape to combine the brewing substance and water for forming a brewed beverage;
    collecting the brewed beverage through the portion of filter tape and into the reservoir;
    displacing the steep chamber away from the reservoir; and
    moving the filter tape relative to the reservoir to force residual brewing substance from the brewing cycle off of the gasket and raised platform and onto the base of the lid.

3. A reservoir and lid assembly for use in a brewer system having a controllably movable filter tape system;
- a portion of filter tape of the filter tape system controllably movably extending over a portion of the lid;
- a steep chamber movable relative to the lid, the steep chamber configured to retain the filter tape over a portion of the lid;
- a brewing substance delivery system configured to controllably dispense brewing substance into the steep chamber;
- a water delivery system configured to controllably dispense water into the steep chamber to mix with the brewing substance and form a brewed beverage;
- the reservoir and lid assembly comprising:
  - a body of the reservoir defining an interior region therein with the lid coupled to the body, the lid formed to define a mouth extending through the lid and communicating with the interior region of the reservoir;
  - the lid includes a base and a raised platform spaced from base, the raised platform includes a perimeter wall extending upward from the base, the mouth is aligned with the raised platform;
  - a filter element coupled to the raised platform and extending over the mouth and configured to support the portion of the filter tape extending over the lid;
  - a gasket providing a sealing surface positioned on an upper end of the perimeter wall away from the base and surrounding the filter element and the mouth; and
  - the steep chamber is aligned with the raised platform with the portion of the filter tape extending between the steep chamber and the raised platform, the steep chamber is controllably displaceable toward and away from the filter tape and the raised platform, a lower end of the steep chamber defining a beveled edge for forcing the filter tape against the surface of the gasket to form a seal around the mouth.

* * * * *